Nov. 22, 1955

L. F. PAHL ET AL 2,724,581

LIQUID PROPORTIONING SYSTEM

Filed May 18, 1951

INVENTORS:
Leo F. Pahl,
Ransom C. Albrecht,
BY Cushman, Darby & Cushman
ATTORNEYS.

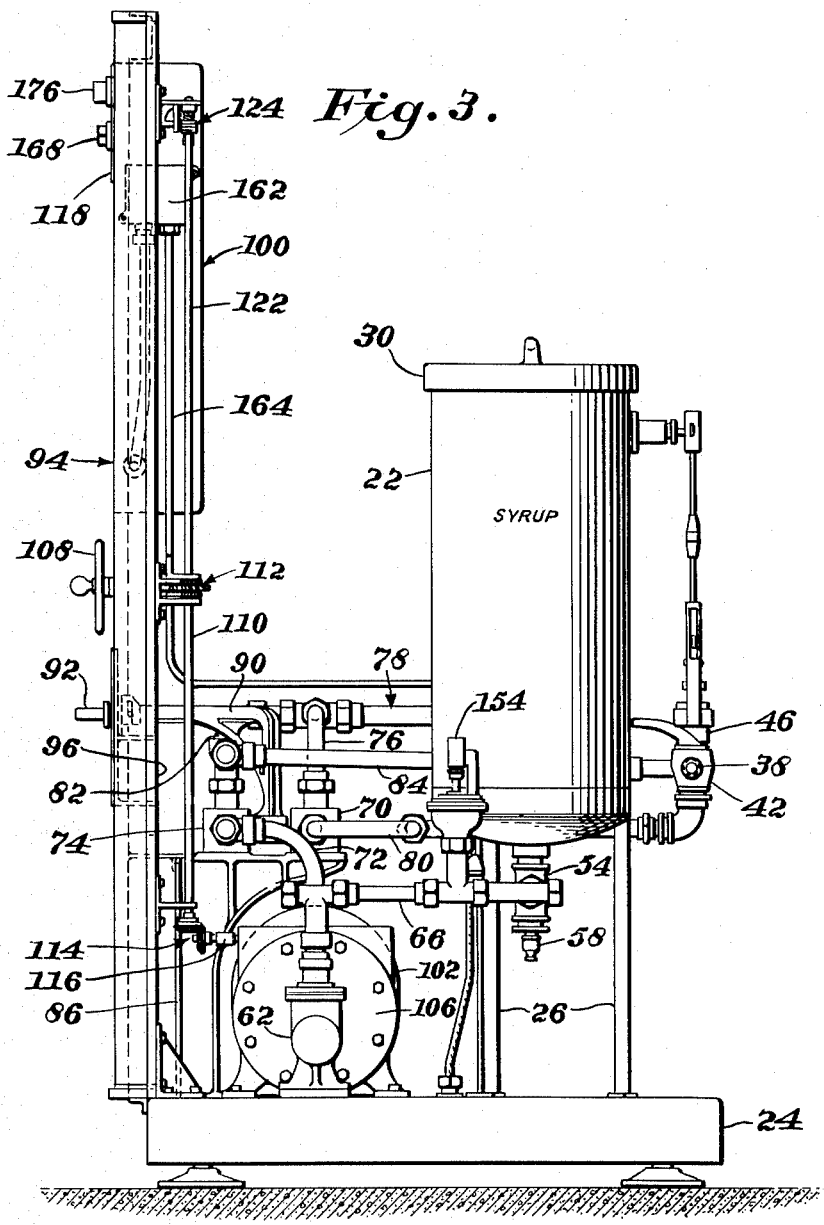

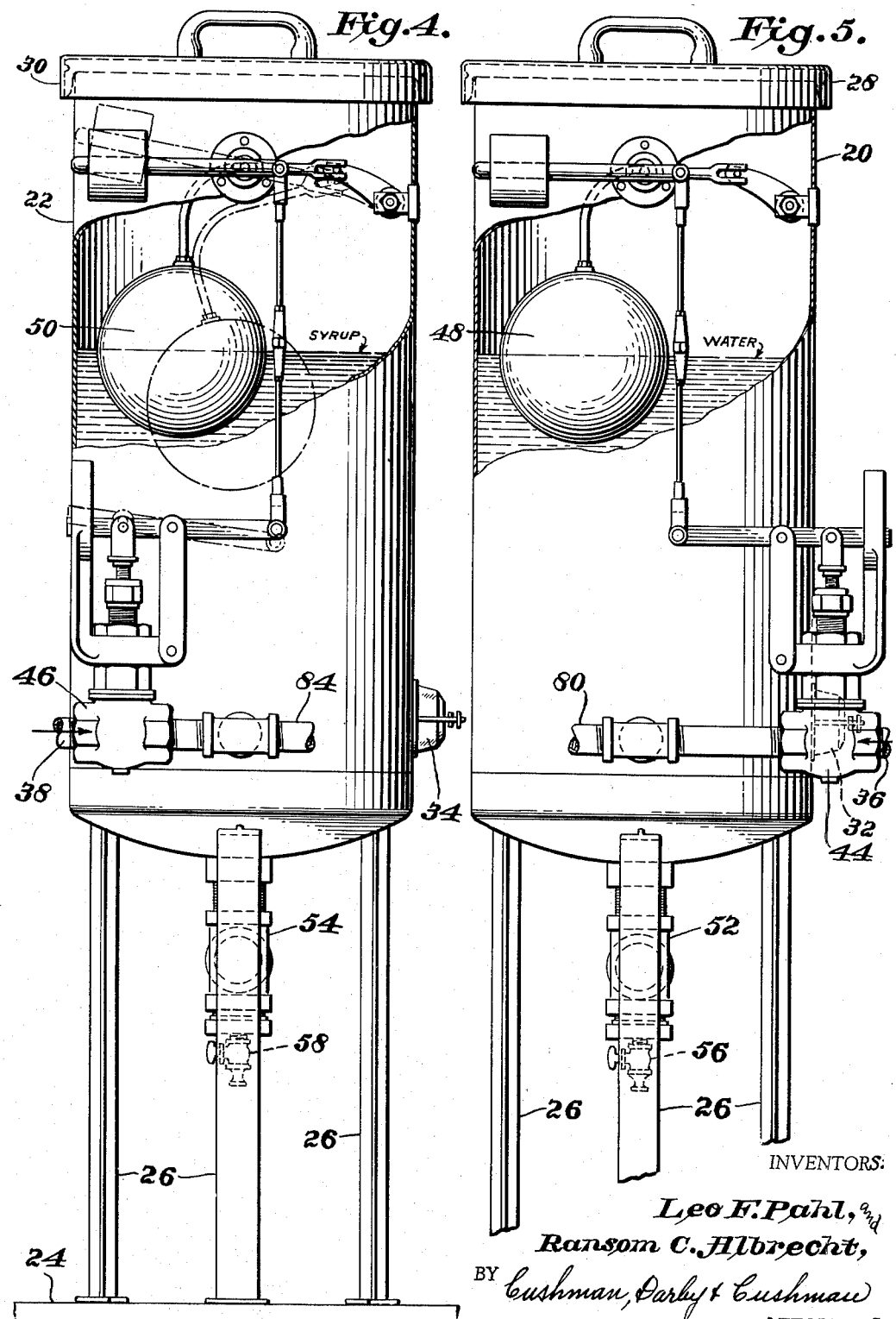

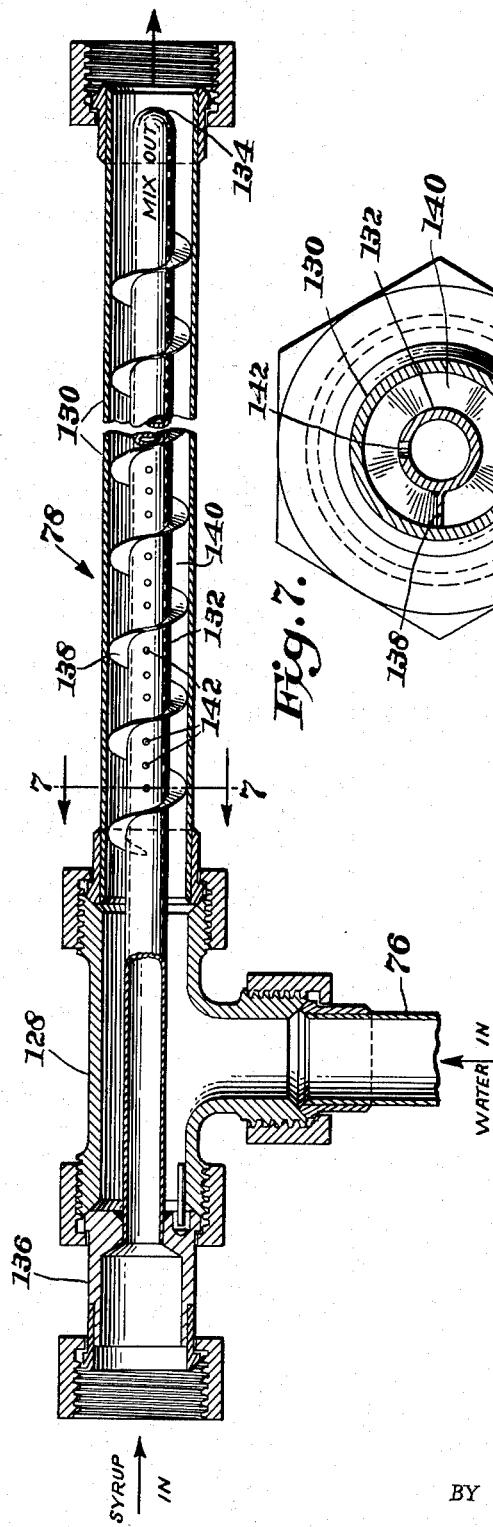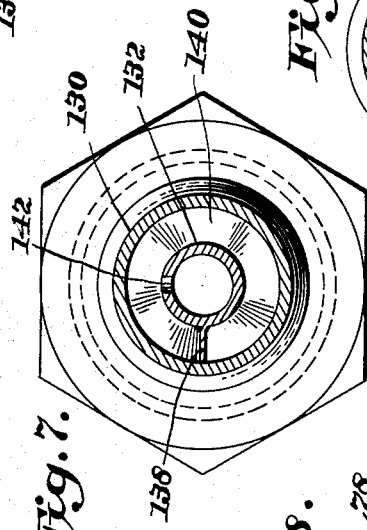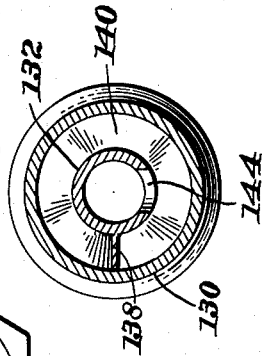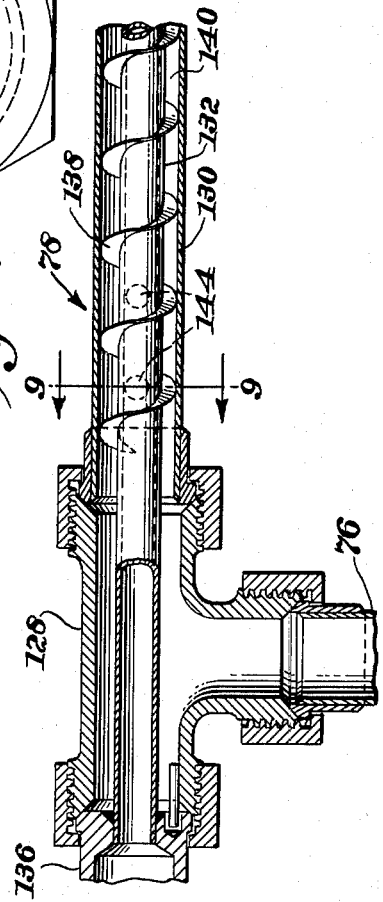

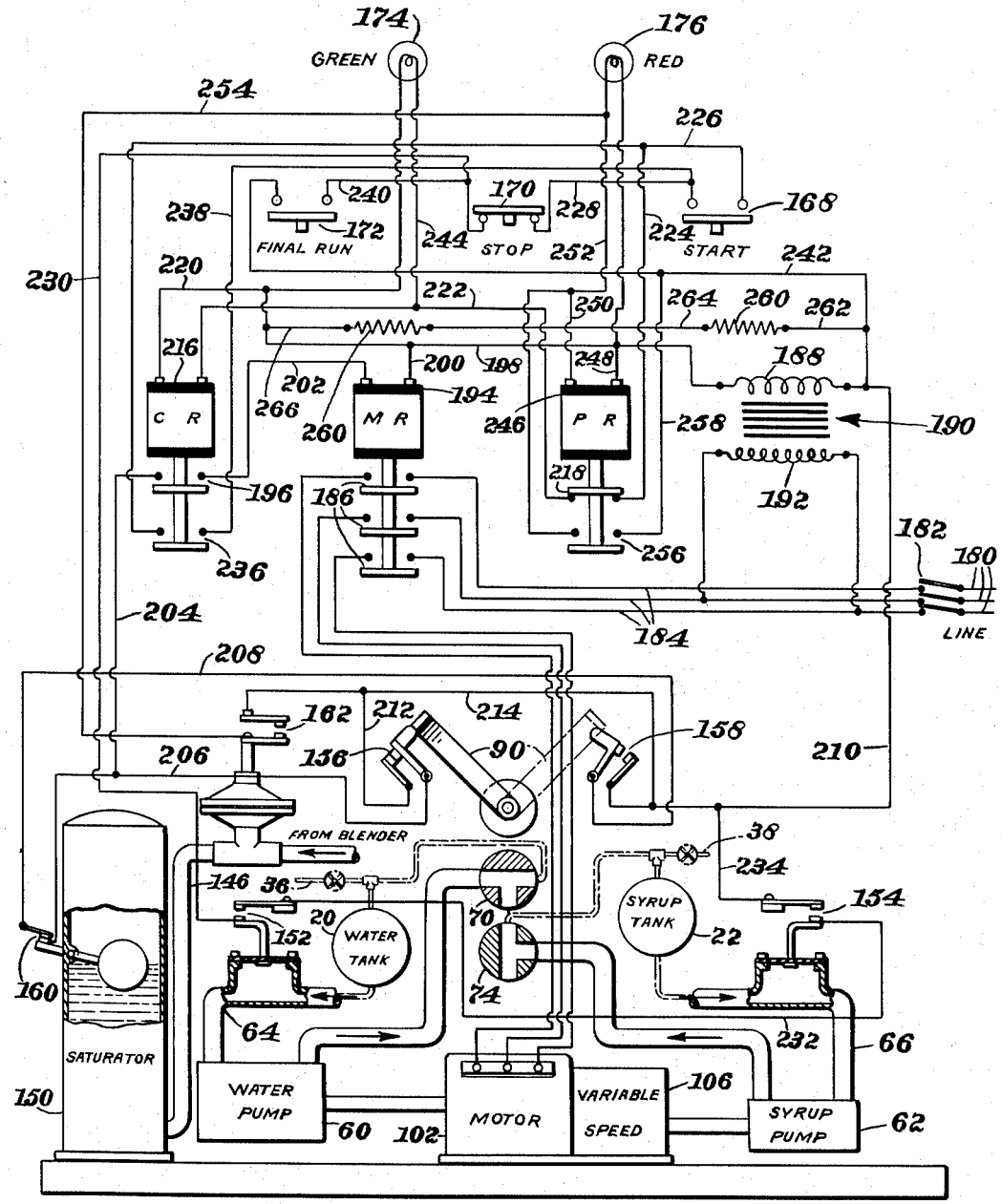

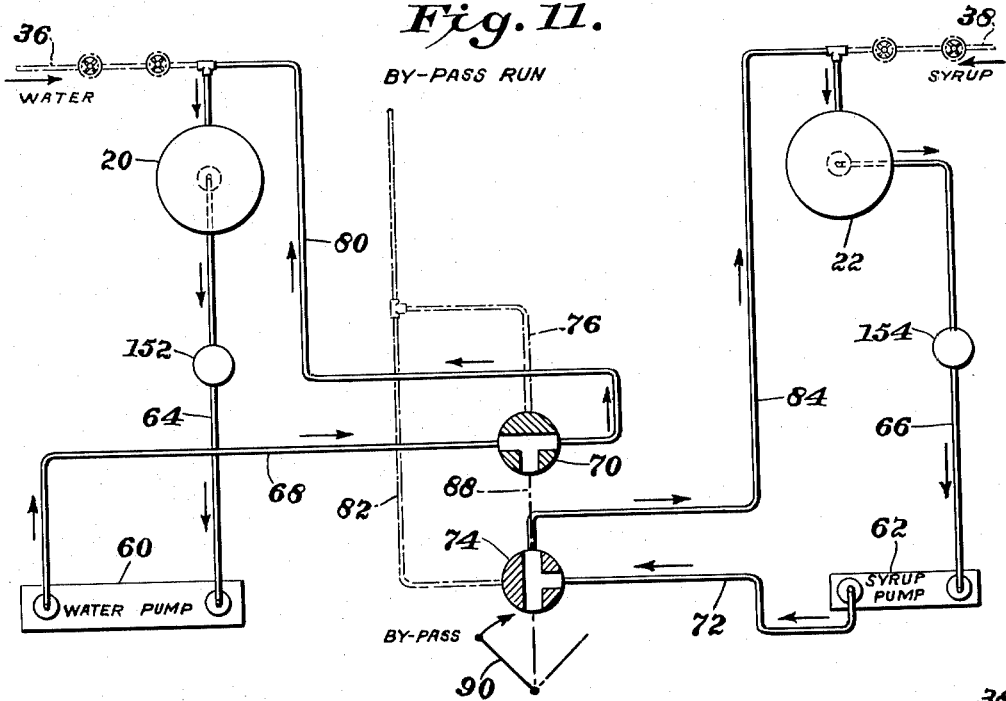
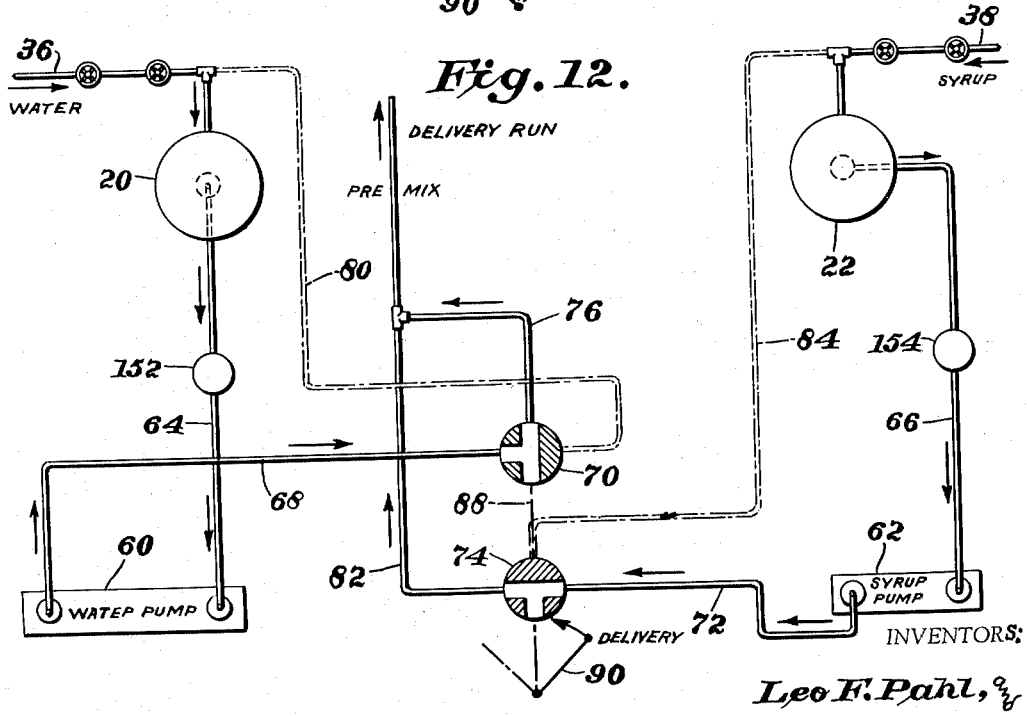

Nov. 22, 1955  L. F. PAHL ET AL  2,724,581
LIQUID PROPORTIONING SYSTEM
Filed May 18, 1951  8 Sheets-Sheet 8
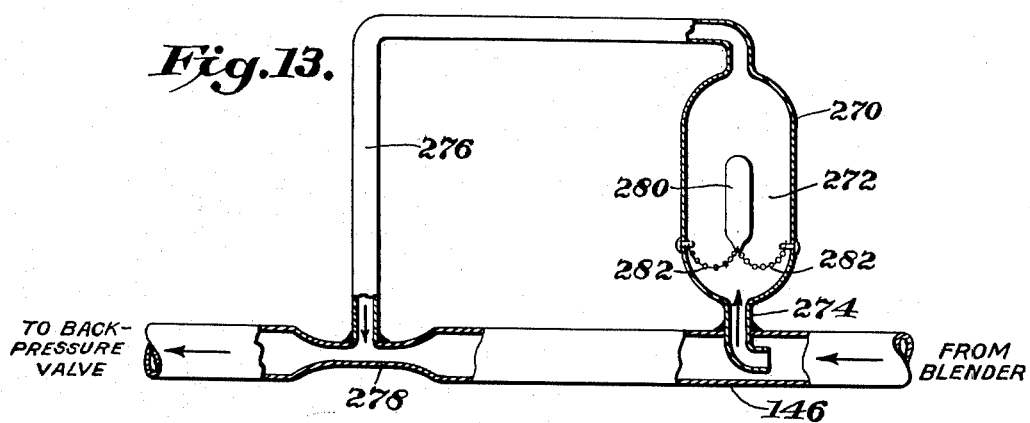
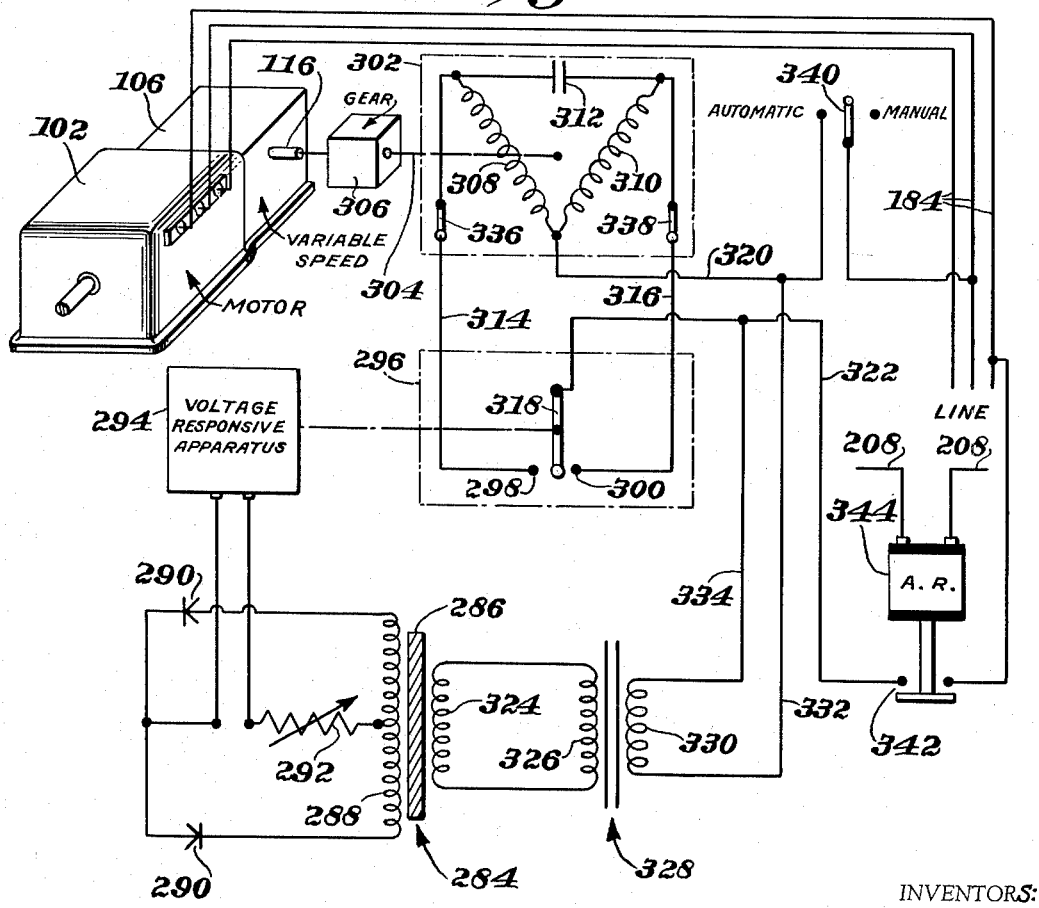
INVENTORS:
Leo F. Pahl,
Ransom C. Albrecht,
BY Cushman, Darby & Cushman
ATTORNEYS.

United States Patent Office 2,724,581
Patented Nov. 22, 1955

2,724,581
LIQUID PROPORTIONING SYSTEM

Leo F. Pahl and Ransom C. Albrecht, Baltimore, Md., assignors to Crown Cork & Seal Company, Inc., Baltimore, Md., a corporation of New York Application May 18, 1951, Serial No. 227,056

19 Claims. (Cl. 259—18)

The present invention relates to liquid proportioning and mixing apparatus.

The embodiment of the invention hereinafter disclosed is described for use in proportioning water and flavoring syrup for the preparation of a carbonated beverage. It will be understood, however, that the invention is applicable to the proportioning of other liquids for other purposes.

In the bottling of carbonated beverages, it has long been the practice to first flow a charge of syrup into a bottle and then flow carbonated water into the bottle. Because the syrup is relatively viscous as compared to the water, the syrup initially will lie in a stratum at the bottom of the bottle. Hence, it is necessary to shake or otherwise move the bottle in some way, either by hand or by machine, in order to agitate its contents for mixing the syrup and the water.

Aside from certain difficulties encountered in causing the syrup and water to be thoroughly mixed in the bottle within a time interval which will keep pace with recently developed high speed bottle filling equipment, the disadvantage of the above described system is that it frequently is impossible to obtain exactly the proper and desired proportion of syrup and water in the bottle and to maintain such proportion constant from bottle to bottle. Although an exactly measured charge of syrup usually can be deposited in a bottle, the quantity of water thereafter deposited is not always a fixed quantity. In order to meet the requirements of the trade, it is desirable that every bottle in a case be filled to exactly the same height. However, the volumetric capacity of bottles is not always constant because of various irregularities inherent in the molding of the same. Hence, it follows that the water increment necessary to fill a bottle to a predetermined height varies from bottle to bottle. Therefore, it is obvious that the proper proportions of syrup to water are not always constant.

In order to overcome the described disadvantages, various methods have been proposed for mixing syrup and water in proper proportions prior to filling the bottles. One such system separately supplies water and syrup to a saturator, from whence the carbonated beverage flows to a bottle filling machine. This system is not completely satisfactory, however, because at the end of a run the syrup supply pipe must be drained of its contents to avoid undue syrup wastage. A two-pipe system also requires two coolers, one for the syrup supply pipe and one for the water supply pipe.

It is, therefore, an object of this invention to provide improved apparatus for exactly proportioning soft drink liquid ingredients and mixing such ingredients prior to delivering the mixture to the saturator.

It is another object of this invention to provide liquid proportioning and mixing apparatus in which the proportions of the mixture delivered therefrom remain constant throughout any one delivery run of the apparatus.

It is still another object of this invention to provide apparatus of the character described in which delivery of the mixture may be shut off and the proportions thereof easily and manually varied without stopping the operation of the liquid moving means employed, i. e., the pumps.

It is still another object of this invention to provide apparatus of the type described in which delivery of the mixture may be shut off and the operation of the fluid moving means continued while making mechanical adjustments to the apparatus.

It is still another object of this invention to provide improved apparatus of the type described which employs a one-pipe system for delivering a properly proportioned mixture to the saturator, thereby permitting cooling of the mixture with a single standard cooler before delivery to the saturator, and also permitting the contents of the system to be flushed away after a run without undue wastage of syrup.

It is still another object of this invention to provide an improved liquid proportioning and mixing system which permits the use of an analyzer and/or controller to continuously sample the output of the system immediately after the liquids have been mixed, the short time interval thus maintained between proportioning and analyzing serving to minimize the delay in indicating and/or correcting incorrect proportions in the mixture.

It is still another object of this invention to provide a liquid proportioning and mixing system having improved controls for assuring that an incorrectly proportioned mixture is not delivered from the system, such controls including means for stopping delivery of the mixture in the event of failure of the supply of one of the ingredients.

It is still another object of this invention to provide an improved device for intimately mixing two flowing liquids.

It is a further object of this invention to provide liquid proportioning and mixing apparatus for carbonated beverage preparation which delivers the mixture at a non-pulsating constant flow rate to the saturator, thereby improving carbonation.

Other objects and advantages of the invention will be apparent from the following description and accompanying drawings.

In the drawings:

Figure 3 is an end elevation of the apparatus, taken from the end which appears at the right in Figures 1 and 2.

Figure 1:
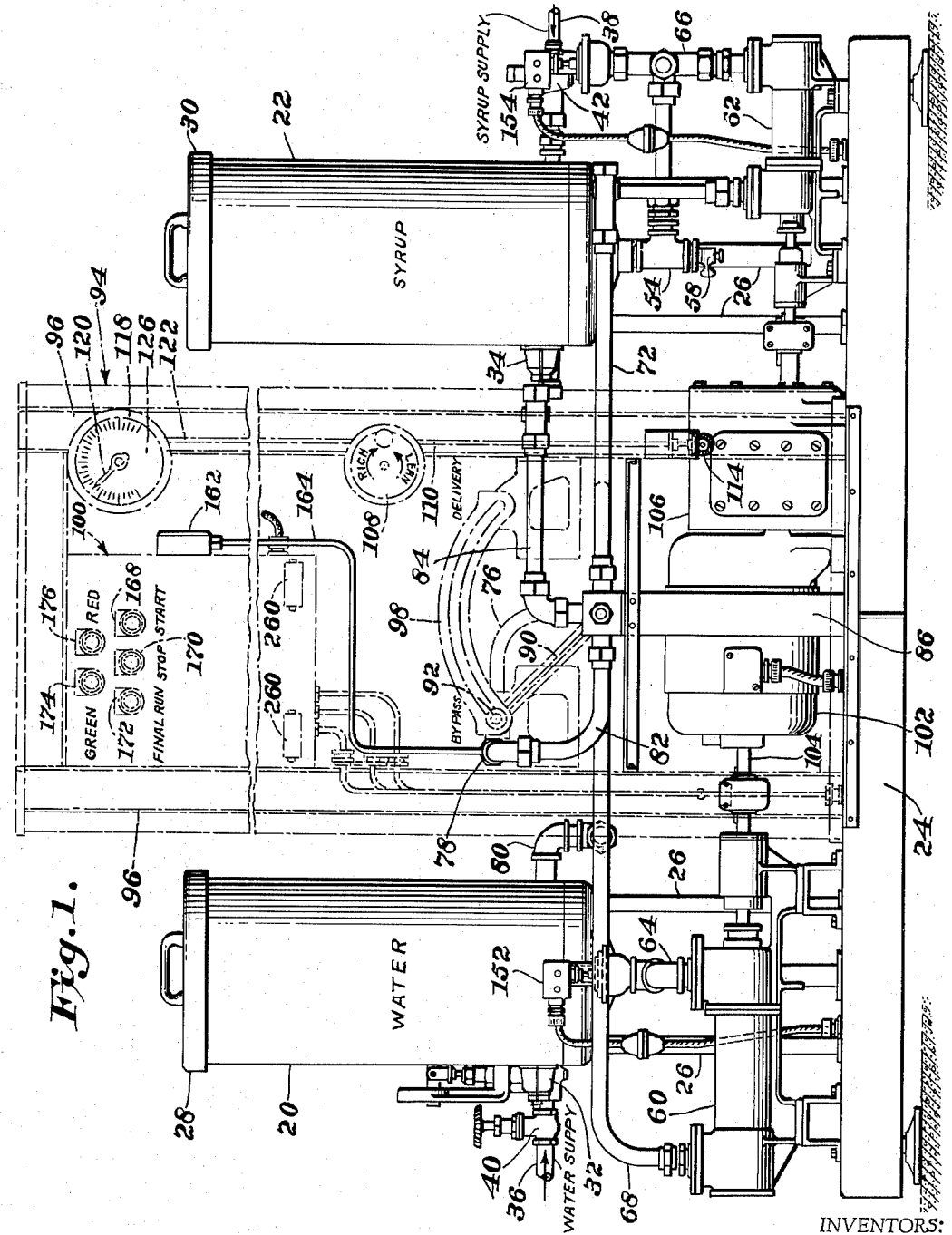
Figure 1 is a front elevation of apparatus embodying this invention. A front control panel, together with several of the controls mounted thereon, are shown in phantom (dotted lines) in order to illustrate details of the remainder of the apparatus located behind such panel.

Figures 4 and 5, respectively, are enlarged rear elevations of the syrup and water tanks, and their associated supply lines, which are included in the apparatus. Portions of the tank walls are broken away to show details more clearly.

Figure 6 is an enlarged horizontal section of a mixing device embodying this invention.

Figure 7 is a cross section taken on line 7—7 of Figure 6.

Figure 8 is a fragmentary horizontal section of a modified form of mixing device embodying this invention.

Figure 9 is a cross section taken on line 9—9 of Figure 8.

Figure 10 is a diagrammatic view illustrating the electical control circuits embodying this invention.

Figure 11 is a diagrammatic view of the liquid flow lines embodying this invention. The valves in the lines are shown in position for non-delivery of the mixture.

Figure 12 is a view corresponding to Figure 11 with the valves shown in position to deliver the mixture from the apparatus.

Figure 13 is a schematic diagram of apparatus for analyzing the mixture delivered by the proportioning and mixing apparatus.

Figure 14 is a schematic diagram of automatic control apparatus for maintaining the proportions of liquids in the delivered mixture within predetermined limits.

Referring now to the drawings, the invention may be described as follows:

The liquid system

Two tanks, substantially identical, 20 and 22 are mounted in vertical position on a generally rectangular flat base 24, somewhat to the rear and at opposite ends thereof. These tanks are supported in elevated position on corresponding legs 26. When the apparatus is to be used for proportioning and mixing water and a flavoring syrup for making a soft drink, the tanks 20 and 22 preferably are made of stainless steel or other easily cleaned sanitary material. Likewise, for such use, all of the piping and other liquid confining fittings of the apparatus are made of similar material, and their joints, if soldered, are soldered with silver solder. Both tanks are provided with removable covers 28 and 30, respectively, for ready accessibility to their interiors for cleaning and flushing purposes. Each tank 20 and 22 is also provided with a sight glass 32 and 34, respectively, mounted externally on the lower portions of the tank side wall.

Figure 2:
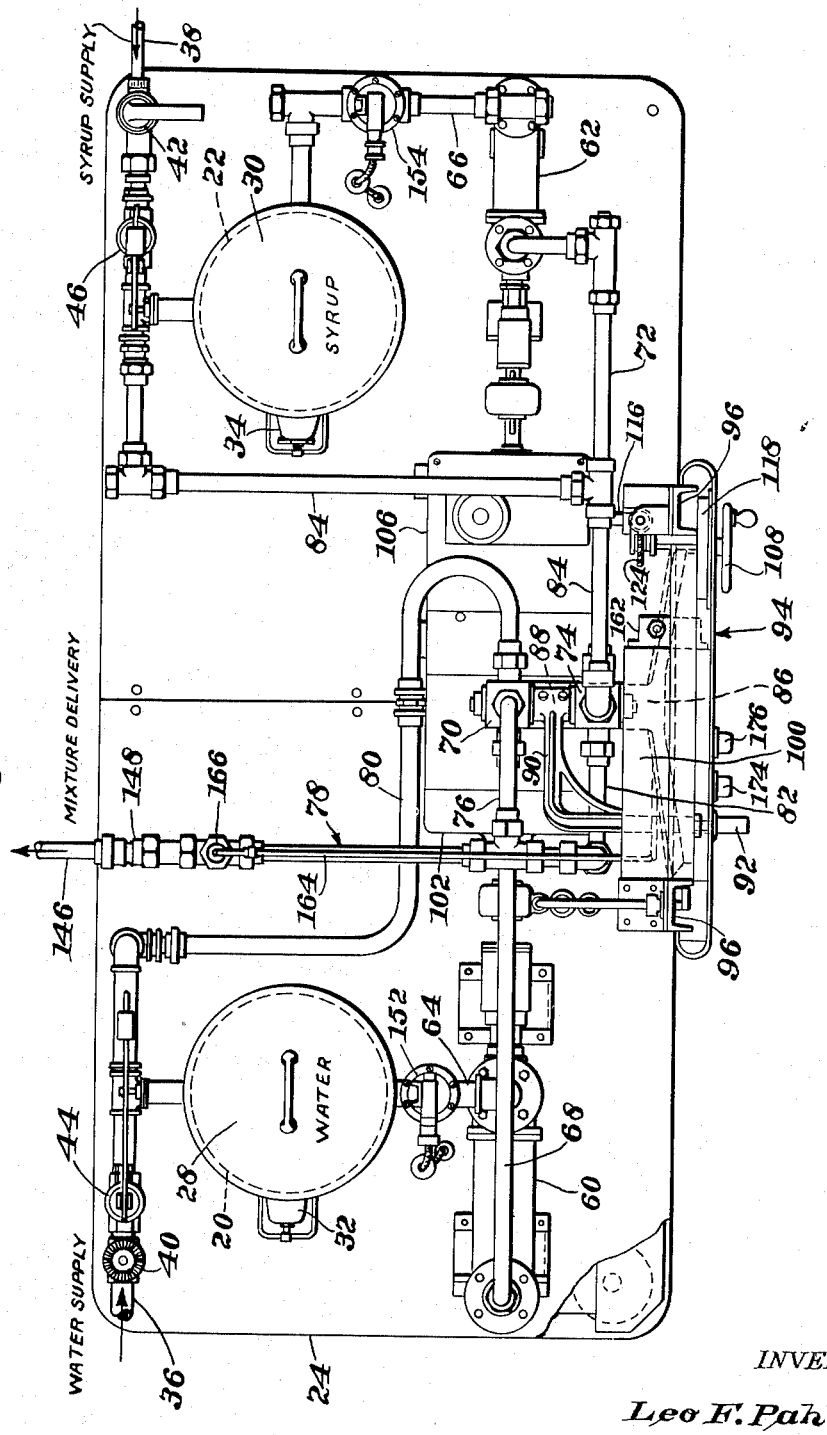
Figure 2 is a plan of the apparatus shown in Figure 1, the front of the apparatus being at the lower edge of the view.

Water is supplied from an appropriate source to the tank 20 located on the left-hand side of the apparatus, as shown in Figures 1 and 2, hereinafter designated the water tank, by a water supply or inlet line 36, while syrup is supplied to the other tank 22, designated the syrup tank, by a syrup supply or inlet line 38. Both lines 36 and 38 are provided with suitable manually-operable shut-off valves 40 and 42, respectively. A constant head of liquid is maintained in each tank by any suitable means, such as the valves 44 and 46, which are interposed in the supply lines 36 and 38, respectively, and controlled by floats 48 and 50 disposed within their respective tanks. These floats are connected to the valves 44 and 46 by suitable lever and linkage systems, as best shown in Figures 4 and 5. Centrally located outlet pipes 52 and 54 depend from the bottoms of the tanks 20 and 22, respectively, and are provided with petcocks 56 and 58 on their lower ends for draining and cleaning purposes.

A water pump 60 and a syrup pump 62 are connected to the respective tanks 20 and 22 to receive liquid therefrom by flow lines 64 and 66 connected to the tank outlet pipes 52 and 54, respectively. These pumps are of the rotary type and, although their internal construction is not shown in detail, they preferably have a helical screw rotor revolving within a stator that has a double internal helical thread. This type of pump is particularly to be preferred for apparatus for proportioning soft drink ingredients because of its non-pulsating output, its minimization of pump slip, and its ability to pump liquids having solids in suspension. The pumps 60 and 62 are mounted on the base 24 in front of their respective tanks 20 and 22, at a lower elevation than the bottoms of the latter, and in spaced substantially axial alignment.

The outlet of the water pump 60 is connected, by a flow line 68, to the inlet port of a three-way valve 70 having two alternate outlet ports. The outlet of the syrup pump 62 is connected, by a flow line 72, to the inlet port of a similar three-way valve 74. One of the outlet ports of the water valve 70 is connected, by a delivery line 76, to a mixing device 78, while the other outlet port of the water valve is connected, by a by-pass line 80, to the inlet line 36 for the water tank, at a point therein between the valve 44 and the tank 20. The outlet ports of the syrup valve 74 are similarly connected, one by a delivery line 82 to the mixing device 78 and the other by a by-pass line 84 to the inlet line 38 for the syrup tank. From this construction and as best shown in Figures 11 and 12, it will be seen that the discharge from each pump may be alternately delivered to the mixing device 78 (Figure 12) or returned to its respective tank (Figure 11).

The valves 70 and 74 are connected for simultaneous operation to either deliver or by-pass both pump discharges. Although any suitable type of valves or valving arrangement may be employed to accomplish the above described result, the embodiment illustrated consists of two three-way rotary plug valves 70 and 74, mounted in axial alignment on a supporting bracket 86 fixed to the base 24 on the front central portion thereof. A common shaft 88 (Figure 2) connects the valve plugs for simultaneous operation and has an L-shaped operating lever 90 secured thereto. One leg of the lever 90 serves as a handle 92 and extends forwardly through an arcuate slot in a control panel 94 that is supported in upstanding position on the front of the base 24 by channels 96. A similarly slotted bracket 98 (Figure 1) is mounted on the channels 96 behind the panel 94 to serve as a guide and to provide end stops for the handle 92.

Also mounted behind the panel 94 on one of the channels 96 is a cabinet 100 which houses certain of the electrical control equipment of the apparatus, as later explained in detail.

The pumps 60 and 62 are driven by a single electric motor 102 mounted on the base 24 between the pumps. One end of the motor shaft 104 is coupled directly to the water pump 60 to provide a direct drive therefor. The other end of the motor shaft 104 drives a variable-speed mechanism or transmission 106 of the type which effects gradual and uniform changes in speed. The variable-speed mechanism is, in turn, coupled to the syrup pump 62 for a changeable-speed drive therefor.

The speed of the syrup pump 62 relative to the water pump 60 may be varied by means of a hand wheel 108 which is mounted on the control panel 94 and connected in any practical manner, such as by a vertical shaft 110 and appropriate gear mechanisms 112 and 114 located behind the panel, to the control member 116 that adjusts the variable-speed mechanism 106. A dial 118 is also mounted on the control panel above the hand wheel and has its pointer 120 connected to an extension 122 of the shaft 110 by an appropriate gear mechanism 124. The dial plate 126 preferably is appropriately graduated to indicate the ratio of water to syrup delivered from the pumps to the mixing device 78 in accordance with the speed ratios and capacities of the water and syrup pumps.

When the apparatus is used for preparing soft drink mixtures, the capacities of the pumps (for a given speed) and the range of the variable-speed mechanism 106 preferably are such that water to syrup ratios ranging between 3.5 to 1 and 7.0 to 1 may be secured by adjustment of the hand wheel 108.

The mixing device or blender 78 is shown best in Figures 6 to 9 and consists of a T fitting 128 having a horizontally disposed tubular casing 130 coupled to one end thereof. Projecting through the T 128 and into the tubular casing 130 is a coaxially disposed tube 132 of reduced diameter and having a closed forward end 134, thus forming an annular space between the internal wall of the casing 130 and the external wall of the tube 132. The tube 132 has an enlarged rearward portion 136 that is coupled in sealing relation to the other end of the T 128. A spiral vane 138 is mounted in the annular space between the casing 130 and the tube 132 and is in contact with the interior wall of the casing and the exterior wall of the tube to form therewith a helical passageway 140. In the embodiment shown in Figures 6 and 7 a longitudinal row of relatively small discharge ports 142 is provided in the upper side of the tube 132 for discharging the contents of the tube into the helical passageway 140. Only a limited number of such ports 142 are provided, twelve as illustrated in Figure 6, three for each of the first four convolutions of the helical passageway 140. It is to be noted that the number of passageway convolutions is preferably double that number (4), so that the passageway 140 continues for a considerable extent past the last three ports 142 in the row. The delivery line 76 from the water valve 70 is coupled to the lateral port of the T 128 and the delivery line 82 from the syrup valve 74 is coupled to the rearward portion 136 of the tube 132.

Hence, when the apparatus is in operation and the valves 70 and 74 are in delivery position, water flows into the helical passageway 140 while syrup flows into the tube 132 and thence through the discharge ports 142 to mix with the water in concurrent flow in the first part of the passageway. From the proportion of the parts shown in Figure 6 it will thus be seen that a thin but wide current of water spirals around the centrally located syrup tube 132 at rather high velocity. This turbulent and ever-changing direction of flow of the water serves to thoroughly mix and blend the syrup emerging from the ports 142 with the water. It also will be noted that the two liquids continue to spiral and mix after the syrup has been projected into the water, to thus make for a more complete blend before the mixture emerges from the blender unit 78. The simplicity of construction of the blender which provides a unit that can be easily disassembled and cleaned in a short time is also a desirable sanitary feature for beverage apparatus.

By disposing the blender 78 in a horizontal position with no portions of the syrup delivery line 82 higher than the blender and positioning the longitudinal row of discharge ports 142 on the upper side of the syrup tube 132, the flow of the two fluids may be stopped, by stopping the pumps, without an undesirable draining, by gravity, of the residual syrup in the tube 132 and in the line 82 into the water remaining in the helical passageway 140.

In the event that the apparatus is to be used for preparing pulpy beverages, such as various types of fruit drinks, the modified blender 78 shown in Figures 8 and 9 is desirable. In this modification, the number of syrup discharge ports 144 is considerably limited, only two being shown in the drawing, one for each of the first two convolutions of the passageway 140. These ports 144, however, are of considerably larger cross-sectional area than those illustrated in Figure 6, having, in fact, a diameter preferably over half that of the syrup tube 132, and are located on the underside of the tube. The location and larger size of these ports 144 inhibit any tendency of the mixer 78 to become clogged by pulpy syrup during operation of the apparatus.

The outlet of the blender 78 is coupled to a mixture delivery line 146 (Figure 2) having a back pressure check valve 148 interposed therein. This valve 148 is set to maintain a predetermined back pressure on the mixture flowing from the blender 78 in order to cause the pumps to work against a constant pressure and, therefore, effect delivery of water and syrup to the blender at a uniform rate.

The mixture delivery line 146 usually is connected to a cooler or saturator 150, indicated diagrammatically in Figure 10.

The controls

The apparatus is provided with a number of automatic controls for insuring delivery of a mixture of constant proportions. To this end the flow lines 64 and 66 from the tanks to the pumps are provided with pressure actuated diaphragm switches 152 and 154, respectively, which are set for actuation at pressures corresponding to substantial failure of the respective liquid supplies to the pumps. These switches 152 and 154 are connected into the electrical system of the apparatus to stop the operation of the motor 102 when either switch is actuated.

The controls also include two limit switches 156 and 158 (Figure 10) mounted at opposite ends of the slot in the guiding bracket 98 for the valve handle 92, in position to be contacted and actuated by the handle in its by-pass and delivery positions, respectively. These limit switches 156 and 158 are also connected into the electrical system of the apparatus so that the motor 102 will not operate to drive the pumps unless one of the switches is actuated by throwing the handle 92 either to by-pass or to delivery position.

The saturator 150 is provided with a level control in the form of a float switch 160 adapted to be actuated when the liquid level in the saturator reaches a predetermined height. This saturator level control switch 160 is connected in series with the delivery position limit switch 158, so that, when the apparatus is in delivery condition, the operation of the motor 102 is controlled by the switch 160 to maintain a constant liquid level in the saturator.

An excessive pressure safety device is also provided for the apparatus and consists of a diaphragm pressure-switch 162 mounted on one side of the cabinet 100 which houses some of the electrical equipment of the electrical control system. The diaphragm of the switch 162 communicates with the mixture delivery line 146, at a point therein, between the blender 78 and the back pressure valve 148, by means of a pressure tube 164. The switch 162 is set to be actuated upon a predetermined excessive pressure in the mixture delivery line and is connected into the electrical system of the apparatus to stop the motor 102 upon the occurrence of such event. Such excessive pressure might occur as a result of a clogging of the back pressure valve 148 or of any part of the mixture delivery line 146 beyond the point of communication of the pressure tube 164 therewith.

As a further precaution against excessive pressures, a mechanical safety device is also employed. This device consists of a rupturable sliver disc or diaphragm 166 (Figure 2) closing a side opening in the mixture delivery line 146 and through which the pressure tube 164 communicates with such line. This disc 166 is designed to rupture at a pressure of about 25 pounds per square inch higher than the actuating pressure for which the pressure switch 162 is set, thereby providing an additional safety feature.

The operating controls for the apparatus consist of three push-button switches 168, 170 and 172 mounted on the upper portion of the control panel 94 and connected into the electrical system. Depression of the push-button switch 168 starts the motor 102 which then can be stopped by depressing push-button switch 170. Depression of the push-button switch 172 renders the supply-failure switches 152 and 154 ineffective so that substantially all the syrup in the tank 22 and its pump supply line 66 can be used up at the end of a run, as later described.

A green indicator lamp 174 and a red indicator lamp 176 are also mounted on the control panel 94 adjacent the push-button switches 168, 170, and 172. The green lamp 174 is connected into the electrical system to be lighted when the apparatus is in operating condition, while the red lamp 176 is connected into the electrical system to be lighted upon actuation of the excessive-pressure switch 162.

The electric circuits

Referring now to Figure 10, which illustrates the electric circuits of the apparatus, it will be seen that the apparatus is designed to be operated from a three-phase source of electrical power, usually 220 volts 60 cycle and indicated by the power lines 180. A master switch 182 serves to connect these power lines 180 with the apparatus. The electric motor 102 specifically illustrated is of three-phase design, and is connected to one side of the master switch 182 by three conductors 184. Three sets of normally-open contacts 186 of a motor-energizing relay MR are interposed in the conductors 184 to control the motor. The remainder of the electric control circuits are operated from a 110 volt source of supply provided by the secondary windings 188 of a transformer 190 having its primary windings 192 connected across two of the conductors 184.

Essentially three circuits are employed to control the relay MR, each deriving its power from the secondary windings 188 of the transformer 190. One control circuit includes the holding coil 194 of the relay MR, one set of normally-open contacts 196 of a control relay CR, the normally-closed saturator level control switch 160, and the normally-open delivery limit switch 158, all connected in series across the transformer secondary windings 188 by conductors 198, 200, 202, 204, 206, 208, and 210, respectively. This circuit also includes the normally-open by-pass limit switch 156 connected in parallel, by conductors 206, 212, and 214, with the series connection of the switches 158 and 160.

It will thus be seen that energization of the control relay CR conditions the circuit thus described, so that throwing the valve handle 92 to either by-pass or delivery position will close the circuit and energize the relay MR. Energization of the latter relay closes its contacts 186 and permits the motor 102 to operate. It will be seen, however, that when the valve handle 92 is in delivery position, the motor operates under the dictates of the saturator level control switch 160.

A second control circuit includes the holding coil 216 of the control relay CR, one set of normally closed contacts 218 of a pressure switch relay PR, the normally-open starting button switch 168, the normally-closed stop button switch 170, the normally-open water pressure switch 152, and the normally-open syrup pressure switch 154, all connected in series across the secondary windings 188 of the transformer 190 by conductors 198, 220, 222, 224, 226, 228, 230, 232, 234, and 210, respectively. It will thus be seen that depression of the starting switch button closes the second control circuit, provided there is a supply of water and syrup in the tanks 20 and 22 to close the pressure switches 152 and 154, and energizes the relay CR to condition the first control circuit for operation.

The control relay CR also has another set of normally-open contacts 236 which are connected in parallel with the starting swtch 168, by conductors 226 and 238, to render the second control circuit self-sustaining upon release of the starting button. The final-run push button switch 172 has normally-open contacts and is connected in parallel, by conductors 240 and 242, with the series connection of the water and syrup pressure switches 152 and 154 in order to shunt out these latter two switches at the end of a delivery run. The green indicator lamp 174 is connected in parallel with the holding coil 216 of the control relay CR, by conductors 220 and 244, to indicate when the apparatus is in operating condition.

The third control circuit includes the holding coil 246 of the pressure switch relay PR and the normally-open over-pressure switch 162 connected in series across the secondary windings 188 of the transformer 190 by conductors 198, 248, 250, 252, 254, 214, and 210, respectively. The pressure switch relay PR also has a set of normally-open contacts 256 which are connected in parallel with the pressure switch 162, by conductors 214, 210, 242, 258, 252, and 254, respectively, to render the third control circuit self-sustaining, after an actuation of the switch 162 by an over-pressure condition, until the relay PR is either re-set by an operator or the master switch 182 is opened. The red indicator lamp 176 is connected in parallel with the holding coil 246 of the relay PR, by conductors 250, 252, and 248, to indicate the actuation of the over-pressure switch 162.

The three relays, MR, CR, and PR, the transformer 190, and the contacts of the push button switches 168, 170, and 172, together with suitable terminal blocks (not shown), are housed within the cabinet 100. Since apparatus of this type is subject to high humidity conditions, it is desirable to provide some means to inhibit corrosion of this relatively delicate electrical equipment. Accordingly, two small electrical heating elements 260 are mounted within the cabinet 100 adjacent the lower portion thereof and are connected in series across the secondary windings 188 of the transformer 190, by conductors 242, 262, 264, 266, and 198, respectively. Hence, whenever the master switch 182 is closed, an elevated temperature is maintained within the cabinet 100 to inhibit corrosion of the electrical equipment housed therein.

*Operation*

While operation of the apparatus is probably evident from the foregoing description, a brief explanation is believed in order. With the tanks 20 and 22 connected to suitable sources of supply of water and syrup, respectively, and the master switch 182 in closed position, the valve handle 92 is thrown to by-pass position and the starting button 168 depressed to thereby start the motor 102 and drive the pumps 60 and 62. The apparatus will then operate to circulate water and syrup respectively from their tanks through their pumps, valves, and by-pass lines back to their respective tanks. At this time the hand wheel 108 may be adjusted to select the desired proportions of water to syrup in the mixture to be delivered and at the same time the aforementioned circulation serves to clear the pumps, their feed lines, and the valves of any air which might be initially entrapped therein. After the desired ratio has been set, the valve handle is thrown to line delivery position and the apparatus will deliver to the saturator 150 a mixture having a constant proportion of water to syrup.

In the event that the liquid level in the saturator 150 rises to a predetermined extent, the saturator level control switch 160 will open and stop delivery of the mixture until such time as the level falls sufficiently to again close the switch. At that time delivery of the mixture in constant proportions will be resumed. In the event that either the water or the syrup supply fails, the apparatus will automatically stop and thereby prevent delivery of an incorrectly proportioned mixture, or only one liquid alone, to the saturator. In the event that the mixture delivery line 146 leading from the blender 78 to the saturator should become clogged for any reason, or in the event that the pressure within the saturator should become excessive for any cause, the pressure switch 162 will actuate and thereby stop the pumps. As previously described, the apparatus cannot again be started, after the occurrence of such an event, until the operator either manually re-sets the pressure switch relay PR or opens and closes the master switch 182.

It also will be noted that the apparatus cannot be operated with the valves 70 and 74 in an intermediate position between by-pass and delivery, thereby safe-guarding against a further possibility of delivering an incorrectly proportioned mixture.

At the end of a delivery run, the final run button 172 is depressed by the operator until the syrup drains out of the syrup tank sight glass 34 (a time interval of about two minutes). The valve handle 92 is then thrown to by-pass position and the stop button 170 depressed. All the syrup is thus utilized except the small amount remaining in the syrup pump 62 and its feed and by-pass piping. This syrup is then drained from the system for future use or the small amount remaining may be flushed away.

By operating the pumps at a fixed speed (for a given water-to-syrup ratio) the pump slip is held constant, resulting in a constant flow rate of the mixture to the saturator to thereby improve the efficiency of carbonation.

A standard cooler (not shown) may easily be interposed in the mixture delivery line 146 at any convenient point between the back-pressure valve 148 and the saturator 150.

Likewise, an analyzing and/or controlling instrument may be connected into the mixture delivery line at any convenient point between the blender 78 and the saturator 150 to continuously sample the mixture being delivered and/or control the variable-speed mechanism 106 to automatically maintain the proportions of the liquids pumped within close limits. Suitable analyzing and controlling apparatus for accomplishing these functions is illustrated in Figures 13 and 14.

Since water and syrup have different densities or specific gravities, the specific gravity of the mixture can be used as a measure of the proportions of water and syrup therein. A continuous indication of the specific gravity of the mixture may be obtained by known apparatus (Figure 13) comprising a vertical casing 270 enclosing a sampling chamber 272. A small quantity of the flowing mixture is continuously by-passed from the delivery line 146 upwardly through the chamber 272 by a small inlet tube 274 extending from the bottom of the casing 270 into the delivery line and having its inlet end facing upstream, as shown. The sample mixture is continuously withdrawn from the chamber 272 by a small outlet tube 276 extending from the top of the casing 270 to the throat of a venturi 278 located in the line downstream from the inlet tube 274.

Substantially freely supported for vertical movement within the sample liquid mixture flowing through the chamber 272 is a submerged plummet 280. Several small chains 282 extend between the sidewall of the casing 270 and the lower end of the plummet 280. The plummet is appropriately weighted so that at the mid-point of the specific gravity indicating range it will support half of the weight of the chains 282 with the casing 270 supporting the other half, as shown in Figure 13. When the specific gravity of the sampled liquid rises above the midrange point, the added buoyancy of the plummet 280 causes it to rise, thus transferring more of the weight of the chains to the plummet. Hence, the plummet will come to rest at a point where the added weight of the chains is equal to the added buoyancy. Obviously, on a reduction in specific gravity, the converse occurs. Hence, the vertical position of the plummet 280 within the chamber 272 indicates the specific gravity of the liquid mixture flowing therethrough.

Although the fluid proportioning apparatus operates satisfactorily under manual control, as an added precaution movements of the plummet 280 may be used to control the speed-changing mechanism 106 to automatically maintain the proportions of the mixture within predetermined limits. A system for such automatic control is illustrated in Figure 14.

Electrical indications of movements of the plummet 280 are obtained by an induction pick-up arrangement consisting of a three-winding differential transformer 284 having its windings located around the outside of the casing 270 and its magnetic core 286 consisting of a magnetic element in the plummet. Hence, the inductance of the transformer 284, and consequently the differential voltage output of its two series-connected secondary windings 288, varies in accordance with the vertical position of the plummet 280. This output voltage is rectified, by rectifiers 290, and applied through a suitable calibrating resistor 292 to an appropriate voltage responsive apparatus 294. The voltage responsive apparatus 294 may include an appropriate meter (not shown) for directly indicating either specific gravity or the proportions of the two liquids in the mixture. Additionally, the voltage responsive apparatus actuates a high and low switch 296 having adjustable contacts 298 and 300. Adjustment of the contacts 298 and 300 serves to limit the range of actuation of the switch 298 to within predetermined voltage, and thus specific gravity, limits.

These contacts 298 and 300 are used to control the operation of a known type of reversible capacitor motor 302 having its shaft 304 connected, by appropriate gears 306, to the control member 116 of the speed-changing mechanism 106. The motor has two series connected windings 308 and 310 having a condenser 312 connected across their ends. When current is applied directly to one winding, the motor shaft 304 will rotate in one direction and when applied directly to the other winding the shaft will rotate in the opposite direction. The capacitor end of one winding 308 is connected, by a conductor 314, to the switch contact 298 while the capacitor end of the other winding 310 is connected, by a conductor 316, to the other switch contact 300. The switch arm 318 and the directly connected ends of the windings 308 and 310 are connected to a suitable source of power, by conductors 320 and 322. Two of the three conductors 184, illustrated in Figure 10, may serve as a convenient source of power, and, if necessary, an appropriate transformer (not shown) may be utilized between the conductors 320 and 322, and conductors 184. The primary windings 324 of the differential transformer 284 are supplied with a constant voltage from the secondary windings 326 of a constant voltage transformer 328 having its primary windings 330 conveniently connected, by conductors 332 and 334, to the conductors 320 and 322, respectively.

In operation, variations in specific gravity of the mixture within predetermined limits, with corresponding variations in the position of the plummet 280, will not produce voltage variations sufficient to cause the voltage responsive apparatus 294 to close either the high or the low contacts 298 and 300. If, however, the specific gravity varies beyond the predetermined limits, one of the switch contacts 298 and 300 will be closed and thus operate the motor 302 in a direction to change the speed of the syrup pump 62 to bring the specific gravity of the mixture back within the predetermined limits. Preferably, the motor conductors 314 and 316 have normally closed limit switches 336 and 338 interposed therein. These limit switches are adapted to be opened by the motor shaft 304 when it reaches a certain angular point in its rotation. Thus, overrunning of the motor 302 is prevented.

A suitable manual switch 340 is interposed in the conductor 320 to shift from manual to automatic control of the change-speed mechanism 106. Additionally, the conductor 322 has the normally open contacts 342 of a relay AR interposed therein. The holding coil 344 of the relay is interposed in the conductor 208, illustrated in Figure 12, so that the automatic control system can be utilized only when the pumps 60 and 62 are delivering to the blender 78.

It will thus be seen that the objects of the invention have been simply and successfully achieved. It will be realized, however, that various changes may be made in the specific embodiment of the invention as illustrated. Therefore, this invention includes all modifications which are encompassed by the spirit and scope of the following claims.

We claim:

1. In a liquid proportioning apparatus: a plurality of pumps each connected to a separate source of liquid; a mixing device; liquid delivery lines connected to the outlets of said pumps and to said mixing device; liquid by-pass connections between said pump outlets and said sources for returning each pumped liquid to its corresponding source; a valve for each of said pumps controlling both the delivery line and the by-pass connection thereof for alternatively delivering the corresponding pumped liquid to the mixing device or returning said liquid to its source; and means connecting all of said valves for simultaneous operation to either deliver or return all of the pumped liquids while said pumps are in operation, whereby at the beginning of a proportioning run of the apparatus the pumped liquids can be bypassed without mixing in order to clear said delivery lines and said pumps of any air trapped therein prior to mixing the pumped liquid.

2. The structure defined in claim 1 in which each valve comprises a multi-way valve.

3. The structure defined in claim 1 including back pressure check valve means connected to the outlet of the mixing device for causing the pumps to operate against a substantially constant pressure.

4. In a liquid proportioning apparatus: a plurality of constant-pressure sources of liquid; an equal number of pumps each connected to a separate one of said sources to receive liquid therefrom; a mixing device; liquid delivery lines connected to the outlets of said pumps and to said mixing device; liquid by-pass connections between said pump outlets and said sources for returning each pumped liquid to its corresponding source; a valve for each of said pumps controlling the delivery line and the by-pass connection thereof for alternatively delivering the corresponding pumped liquid to the mixing device or returning said liquid to its source; and means connecting all of said valves for simultaneous operation to either deliver or return all of the pumped liquids while said pumps are in operation, whereby at the beginning of a proportioning run of the apparatus the pumped liquids can be bypassed without mixing in order to clear said delivery lines and said pumps of any air trapped therein prior to mixing the pumped liquids.

5. In a liquid proportioning apparatus: a plurality of pumps each connected to a separate source of liquid; liquid delivery lines connected to the outlets of said pumps and adapted to deliver all of the separately pumped liquids to a mixing device; liquid by-pass connections between said pump outlets and said sources for returning each pumped liquid to its corresponding source; valve means controlling each of said delivery lines and its corresponding by-pass connection for alternatively delivering the corresponding pumped liquid to the mixing device or returning said liquid to its source, said valve means being connected for simultaneous operation to either deliver or return all of the pumped liquids; driving means for said pumps; and manually adjustable means for separately changing the speeds of the drives of all but one of said pumps relative to the speed of drive of said one pump.

6. The structure defined in claim 5 including means responsive to the pressure of the liquid flowing from each of the sources to its corresponding pump for stopping the pump driving means upon the substantial failure of supply of said liquid.

7. The structure defined in claim 5 including: a mixing device having the delivery lines connected thereto; means responsive to a predetermined high liquid pressure at the outlet of said device for stopping the pump driving means; and pressure-rupturable means in communication with said outlet and rupturable at a pressure in excess of said predetermined pressure for relieving excessive pressures in the event of failure of said pressure-responsive means.

8. The structure defined in claim 5 including control means for the pump driving means associated with the valve means and actuated either in the delivery or in the return positions thereof for permitting operation of said pump driving means only when said valve means are in one or the other of said positions, whereby said pump driving means cannot operate in intermediate positions of 9. In a liquid proportioning apparatus: a plurality of constant-pressure sources of liquid; an equal number of pumps each connected to a separate one of said sources to receive liquid therefrom; liquid delivery lines connected to the outlets of said pumps and adapted to deliver all of the separately pumped liquids to a mixing device; liquid by-pass connections between said delivery lines and said sources for returning each pumped liquid to its corresponding source; multi-way valve means controlling each of said delivery lines and its associated by-pass connection for alternatively delivering the corresponding pumped liquid to the mixing device or returning said liquid to its source, all of said valve means being connected for simultaneous operation to either deliver or return all of the pumped liquids; motor means driving said pumps; and manually-adjustable means for separately changing the speeds of the drives of all but one of said pumps relative to the speed of the drive of said one pump.

10. In a liquid proportioning apparatus: first and second constant-pressure sources of liquid; first and second pumps connected respectively to said sources to receive liquid therefrom; liquid delivery lines connected to the outlets of said pumps and adapted to deliver both of the separately pumped liquids to a mixing device; liquid by-pass connections between said pump outlets and said sources for returning each pumped liquid to its corresponding source; multi-way valve means controlling each of said delivery lines and its corresponding by-pass connection for alternatively delivering the corresponding pumped liquid to the mixing device or returning said liquid to its source, both of said valve means being connected for simultaneous operation to either deliver or return both of the pumped liquids; motor means driving said pumps; and manually-adjustable means for changing the speed of the drive of one of said pumps relative to the other.

11. Liquid proportioning apparatus comprising: a pair of tanks for liquids each adapted to be connected to a separate source of liquid supply and being provided with means for maintaining a substantially constant liquid level therein; a rotary pump connected to the outlet of each said tank to receive liquid therefrom; a three-way valve connected to the outlet of each said pump; a delivery line leading from each said valve; a by-pass line leading from each said valve to its respective said tank; said valves being connected for simultaneous operation to deliver the liquids discharged from both said pumps or to return said liquids to their respective tanks; a common electric driving motor for said pumps; and manualy-adjustable speed-changing means interposed in the drive for one of said pumps for regulating the proportions of the liquids discharged from said pumps.

12. The structure defined in claim 11 including: a motor-controlling circuit and a pair of limit switches connected in parallel therein and actuable by operation of the valves to permit the motor to operate, one of said switches being actuated when said valves are in delivery position and the other being actuated when said valves are in return position, whereby when said valves are in an intermediate position said circuit renders the pumps inoperative.

13. The structure defined in claim 11 including: a motor-controlling circuit, which when closed permits the motor to operate, and a pair of pressure-responsive switches connected in series therein, one of said switches being disposed to respond to the pressure of the liquid flowing from one of the tanks to its corresponding pump and the other switch being disposed to respond to the pressure of the liquid flowing from the other of said tanks to its corresponding pump, both of said switches being set to be closed above predetermined pressures corresponding to substantial failure of the liquid supply from the corresponding tanks, whereby failure of the liquid supply from either of said tanks serves to open said motor-controlling circuit and thereby stop the pumps.

14. The structure defined in claim 11 including: a motor-controlling circuit, which when closed permits the motor to operate, and a pair of pressure-responsive switches connected in series therein, one of said switches being disposed to respond to the pressure of the liquid flowing from one of the tanks to its corresponding pump and the other switch being disposed to respond to the pressure of the liquid flowing from the other of said tanks to its corresponding pump, both of said switches being set to be closed above predetermined pressures corresponding to substantial failure of the liquid supply from the corresponding tanks, whereby failure of the liquid supply from either of said tanks serves to open said motor-controlling circuit and thereby stop the pumps; and a normally-open manually-operable switch shunted across both of said pressure-responsive switches to enable said tanks to be substantially emptied at the end of a delivery run.

15. The structure defined in claim 11 including: a liquid mixing device having the delivery lines connected thereto; a back-pressure valve in the line leading from the mixing device to cause the pumps to work against a substantially constant pressure; a pressure-responsive switch disposed to respond to the pressure at the outlet of the mixing device and actuable by a predetermined excessive pressure; a relay having contacts connected into a motor-controlling circuit; and a circuit having said switch and the holding coil of said relay connected in series therein.

16. The structure defined in claim 11 including: a liquid mixing device having the delivery lines connected thereto; a back-pressure valve in the line leading from the mixing device to cause the pumps to work against a substantially constant pressure; a pressure-responsive switch disposed to respond to the pressure at the outlet of the mixing device and actuable at a predetermined excessive pressure; a relay having two sets of contacts; a switch circuit having said switch and the holding coil of said relay connected in series therein and one set of said relay contacts connected in parallel with said switch for self-sustaining operation of said relay after operation by said switch; and a motor-controlling circuit having the other set of said relay contacts connected in series therein, whereby an excessive pressure rise serves to stop the pumps and to maintain them inoperative until said relay is re-set.

17. The structure defined in claim 11 including: a liquid mixing device having the delivery lines connected thereto; a tank connected to the mixing device to receive liquid therefrom; a motor-controlling circuit; a pair of normally-open limit switches connected in parallel therein and actuable by operation of the valves to permit the motor to operate, one of said switches being actuated when said valves are in delivery position and the other of said switches being actuated when said valves are in return position; and a normally-closed switch responsive to the liquid level in said tank and set to open at a predetermined high liquid level therein, said level-responsive switch being connected in series with said one limit switch.

18. In a liquid proportioning apparatus: a pair of pumps each connected to a separate source of different liquid; a liquid mixing device; a liquid delivery line leading from the outlet of each said pump to said mixing device; driving means for said pumps; adjustable speed changing means for varying the speed of the drive of one of said pumps relative to the other; and means responsive to the proportions of the different liquids in the mixture discharged from said mixing device for adjusting said speed changing means to maintain said proportions within predetermined limits.

19. In a liquid proportioning apparatus: a pair of pumps each connected to a separate source of different liquid; a liquid mixing device; a liquid delivery line leading from the outlet of each said pump to said mixing device; a common driving motor for said pumps; adjustable speed-changing means interposed in the drive for one of said pumps for regulating the proportions of the liquids discharged from said pumps; specific gravity responsive means connected to the outlet of said mixing device; and motor means controlled by said specific gravity responsive means for adjusting said speed changing means to maintain the specific gravity of the mixture within predetermined limits.

References Cited in the file of this patent

UNITED STATES PATENTS

| Number | Name | Date |
|---|---|---|
| 631,625 | En Earl | Aug. 22, 1889 |
| 1,297,081 | Brown | Mar. 11, 1919 |
| 1,332,945 | Holderie | Mar. 9, 1920 |
| 1,372,172 | Larsen | Mar. 22, 1921 |
| 1,626,487 | Warren | Apr. 26, 1927 |
| 1,696,738 | Stedwell | Dec. 25, 1928 |
| 1,737,609 | Nielson | Dec. 3, 1929 |
| 1,740,477 | Rodman et al. | Dec. 24, 1929 |
| 1,763,152 | Hill | June 10, 1930 |
| 1,964,028 | Boynton et al. | June 26, 1934 |
| 1,981,496 | Buttner | Nov. 20, 1934 |
| 2,070,004 | Davis | Feb. 9, 1937 |
| 2,203,980 | Burt | June 11, 1940 |
| 2,244,106 | Granberg | June 3, 1941 |
| 2,244,686 | Garrison et al. | June 10, 1941 |
| 2,262,031 | Meyer | Nov. 11, 1941 |
| 2,312,639 | Gronemeyer | Mar. 2, 1943 |
| 2,352,584 | Ziebolt et al. | June 27, 1944 |
| 2,394,297 | Fayles | Feb. 5, 1946 |
| 2,401,914 | Di Pietro | June 11, 1946 |
| 2,529,656 | Hettelsater | Nov. 14, 1950 |
| 2,574,368 | Arant | Nov. 6, 1951 |